(12) United States Patent
Wang et al.

(10) Patent No.: US 12,321,308 B2
(45) Date of Patent: Jun. 3, 2025

(54) INTEGRATED CIRCUIT (IC) DEVICES WITH EFFICIENT PIN-SHARING FOR MULTIPROTOCOL COMMUNICATION INTERFACE

(71) Applicant: Analog Devices International Unlimited Company, Limerick (IE)

(72) Inventors: Yong Wang, Beijing (CN); Rengui Luo, Beijing (CN)

(73) Assignee: Analog Devices International Unlimited Company, Limerick (IE)

( * ) Notice: Subject to any disclaimer, the term of this patent is extended or adjusted under 35 U.S.C. 154(b) by 20 days.

(21) Appl. No.: 17/961,977

(22) Filed: Oct. 7, 2022

(65) Prior Publication Data
US 2024/0078209 A1 Mar. 7, 2024

(30) Foreign Application Priority Data
Sep. 2, 2022 (WO) ................ PCT/CN2022/116784

(51) Int. Cl.
| | |
|---|---|
| G06F 13/00 | (2006.01) |
| G06F 9/30 | (2018.01) |
| G06F 13/374 | (2006.01) |
| G06F 13/42 | (2006.01) |

(52) U.S. Cl.
CPC ...... G06F 13/4291 (2013.01); G06F 9/30101 (2013.01); G06F 13/374 (2013.01)

(58) Field of Classification Search
CPC . G06F 13/4291; G06F 9/30101; G06F 13/374
See application file for complete search history.

(56) References Cited

U.S. PATENT DOCUMENTS

| | | | |
|---|---|---|---|
| 8,495,270 B2 | 7/2013 | Maruko | |
| 2009/0249089 A1* | 10/2009 | Tremel | G06F 1/3203 |
| | | | 713/300 |
| 2014/0013151 A1* | 1/2014 | DeCesaris | G06F 13/4282 |
| | | | 710/110 |
| 2015/0363353 A1* | 12/2015 | Enami | G06F 1/08 |
| | | | 710/110 |
| 2016/0378153 A1* | 12/2016 | Kelly | G06F 13/4022 |
| | | | 713/300 |
| 2020/0195450 A1* | 6/2020 | Bains | G06F 13/1668 |

* cited by examiner

*Primary Examiner* — Henry Tsai
*Assistant Examiner* — Kim T Huynh
(74) *Attorney, Agent, or Firm* — Knobbe, Martens, Olson & Bear, LLP

(57) ABSTRACT

Systems and methods related to communication interface are provided. An interface circuitry arrangement for communication between integrated circuit (IC) devices, the interface circuitry arrangement including serial peripheral interface (SPI) circuitry having an SPI clock port, an SPI data port, and an SPI chip select (CS) port; inter-integrated circuit (I2C) circuitry having an I2C clock port and an I2C data port, wherein the I2C clock port and the SPI clock port are electrically coupled to a first connection port, and wherein the I2C data port and the SPI data port are electrically coupled to a second connection port; pattern detection circuitry to detect a signal pattern at a third connection port, the third connection port electrically coupled to the SPI CS port; and selection circuitry to selectively couple the SPI circuitry or the I2C circuitry to a data path responsive to an output of the pattern detection circuitry.

20 Claims, 7 Drawing Sheets

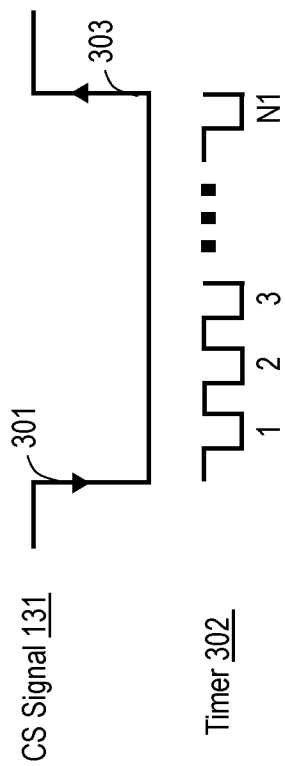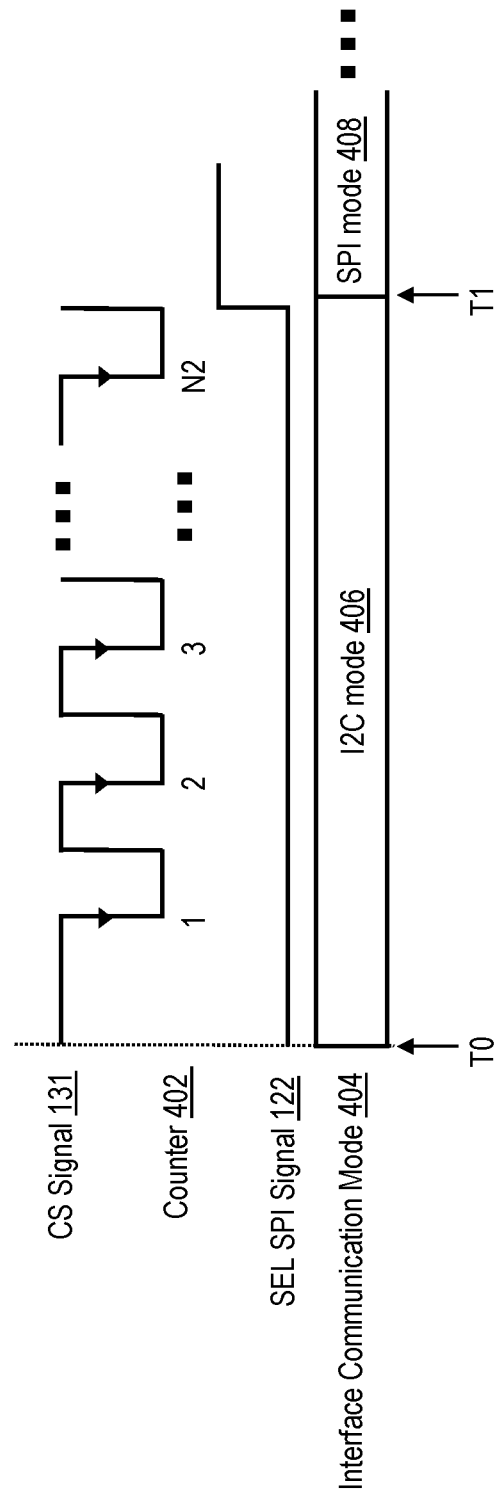

INTEGRATED CIRCUIT (IC) DEVICES WITH EFFICIENT PIN-SHARING FOR MULTIPROTOCOL COMMUNICATION INTERFACE

CROSS-REFERENCE TO RELATED APPLICATION(S)

This application claims the benefit of and hereby incorporates by reference, for all purpose, the entirety of the contents of International Application No. PCT/CN2022/116784, filed Sep. 2, 2022, and entitled, "INTEGRATED CIRCUIT (IC) DEVICES WITH EFFICIENT PIN-SHARING FOR MULTIPROTOCOL COMMUNICATION INTERFACE."

TECHNICAL FIELD OF THE DISCLOSURE present disclosure generally relates to electronics, and more particularly to integrated circuit (IC) devices with efficient pin-sharing for multiprotocol communication interface.

BACKGROUND

Serial peripheral interface (SPI) and inter-integrated circuit (I2C) interface are widely used for communications between integrated circuit (IC) devices or components, for example, between a microcontroller and a peripheral device such as sensors, analog-to-digital converters (ADCs), digital-to-analog converter (DACs), memory, optical devices, etc. SPI is a synchronous, full-duplex master-slave-based serial communication interface. The data from an SPI master device or an SPI slave device is synchronized on the rising or falling edges of a clock signal provided by the SPI master device. Both the SPI master device and the SPI slave device can transmit data at the same time, for example, using a 4-wire SPI including a clock line, a chip select (CS) line, a master input, slave output (MISO) data line, and a master output, slave input (MOSI) data line. On the other hand, I2C is a half-duplex master-slave-based serial communication interface using two wires, a clock line and a bidirectional data line. Similar to SPI, an I2C master device may provide a clock signal and data may be communicated between the I2C master device and an I2C slave device based on the rising or falling edges of the clock signal. Some devices may include a multiprotocol communication interface (e.g., including both an SPI and an I2C interface) to provide flexibility for communicating with various devices.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 3 is a timing diagram illustrating exemplary operations in SPI/I2C mode detection, according to various embodiments of the present disclosure;

FIG. 4 is a timing diagram illustrating exemplary operations in SPI/I2C mode detection, according to various embodiments of the present disclosure;

DESCRIPTION OF EXAMPLE EMBODIMENTS OF THE DISCLOSURE

Overview

Figure 1:
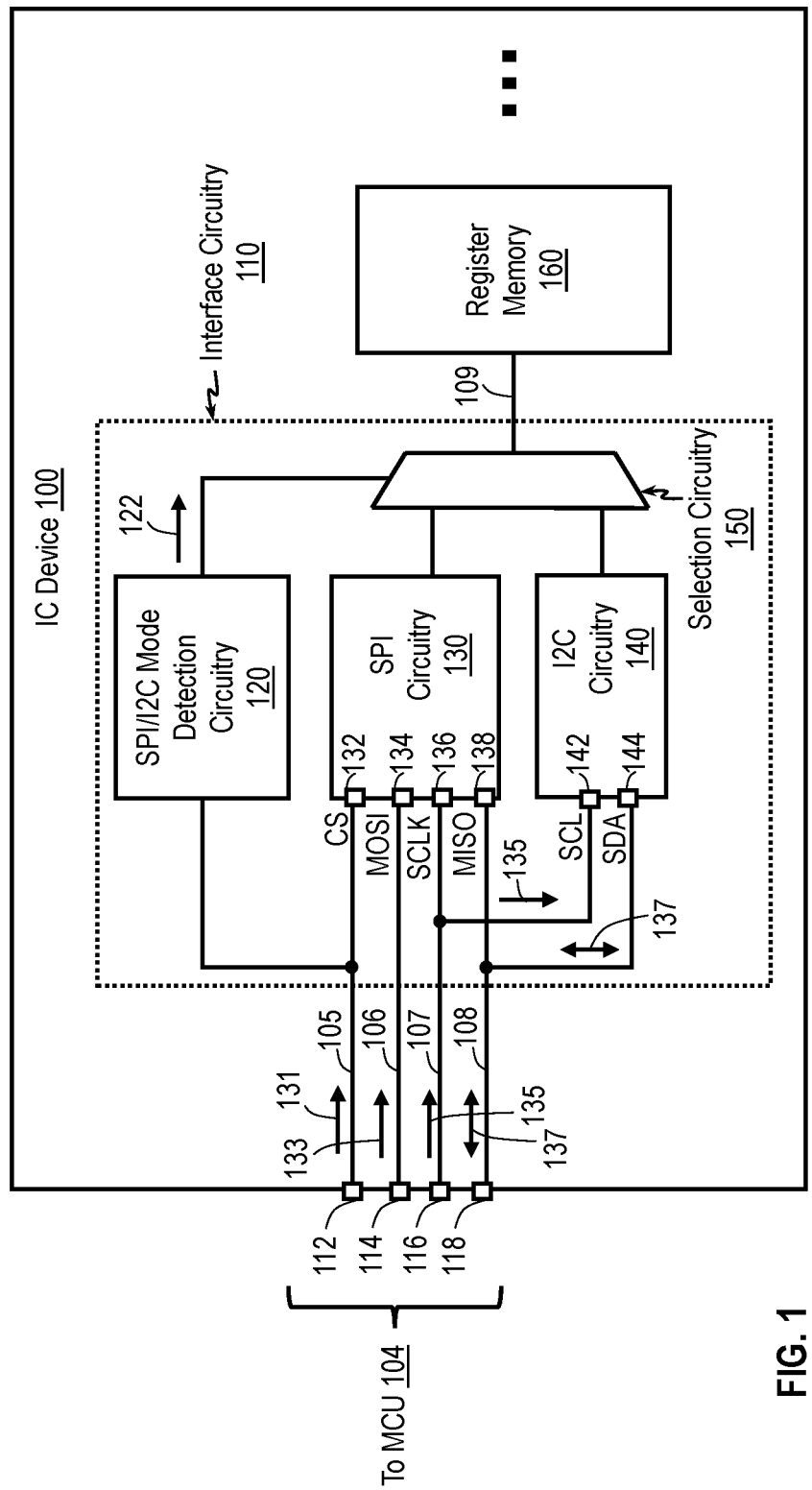
FIG. 1 is a schematic diagram of an exemplary integrated circuit (IC) device that implements an efficient serial peripheral interface (SPI)/inter-integrated circuit (I2C) pin-sharing scheme, according to various embodiments of the present disclosure.

The systems, methods and devices of this disclosure each have several innovative embodiments, no single one of which is solely responsible for all of the desirable attributes disclosed herein. Details of one or more implementations of the subject matter described in this specification are set forth in the description below and the accompanying drawings.

As described above, some integrated circuit (IC) devices may include a multiprotocol serial communication interface (e.g., including both a serial peripheral interface (SPI) and an inter-integrated circuit (I2C) interface) to provide flexibility for communicating with various devices. For example, a slave device (or a peripheral device) may include an SPI and an I2C interface and a master device (or a controller) may select to communicate with the slave device using the SPI or the I2C interface. In certain examples, the SPI may be a 4-wire interface and the I2C may be a 2-wire interface as described above. Because only one of the interfaces, the SPI or the I2C interface, may be activated at any given time, the SPI and the I2C interface can share some of the signal pins (or connections) to minimize the number of pins or connections at the slave device. As an example, instead of assigning four pins (or connections) for an SPI and two pins (or connections) for an I2C interface separately, the I2C interface can utilize the SPI data connection for I2C data communication and the SPI clock connection for I2C clock signal communication. In other words, the sharing of clock and data pins (or connections) between the SPI and I2C interface can allow for a pin-count reduction (e.g., from 6 pins to 4 pins). As used herein, an SPI/I2C interface may refer to an interface that implements both an SPI communication protocol and an I2C communication protocol, where one of the SPI or the I2C communication protocol may be in use at any given time.

One approach to supporting the selection between an SPI interface and an I2C interface in an SPI/I2C interface is to include an additional, dedicated pin or connection for the selection. That is, a selectable SPI/I2C interface may include five connections or pins. However, as the die size of IC device decreases, the available area for pin connections may be limited. Accordingly, it may be desirable to further reduce the number of pins for an SPI/I2C interface with selectable SPI or I2C interface.

The present disclosure describes mechanisms for sharing pins or connections efficiently between an SPI and an I2C interface in an SPI/I2C interface without utilizing an additional, dedicated selection pin or connection for selecting between the SPI and the I2C interface. In an aspect of the present disclosure, an IC device may include interface circuitry for communication with one or more other devices. In some examples, the IC device may be a slave device and the one or more other devices may be a master device. The interface circuitry may include SPI circuitry, I2C circuitry, and four connection ports (e.g., pins or terminals for connections to the one or more other devices). The SPI circuitry may have an SPI clock port, an SPI data port, and an SPI CS port. The I2C circuitry may have an I2C clock port and an I2C data port. The I2C clock port and the SPI clock port may be electrically coupled to a first connection port (e.g., a pin or a terminal) of the IC device. Stated differently, the I2C clock port and the SPI clock port may share the same (or common) first connection port for clock signal communication. Further, the I2C data port and the SPI data port may be electrically coupled to a second connection port (e.g., a pin or a terminal) of the IC device separate from the first connection port. Stated differently, the I2C data port and the SPI data port may share the same (or common) second connection port for data signal communication. The interface circuitry may further include pattern detection circuitry to detect a signal pattern at a third connection port (e.g., a pin or a terminal) of the IC device. The third connection port may be electrically coupled to the SPI CS port. The interface circuitry may further include selection circuitry to selectively couple the SPI circuitry or the I2C circuitry to a data path (of the IC device) responsive to an output of the pattern detection circuitry. That is, the pattern detection circuitry may automatically detect whether to communicate with another device using the I2C communication protocol or the SPI communication protocol based on a CS signal sent by the other device. Stated differently, the pattern detection circuitry and the SPI CS port may share the same (or common) third connection for SPI CS selection or mode switch indication. Further, the pattern detection circuitry may also be referred to as SPI/I2C mode detection circuitry or simply mode detection circuitry.

In some aspects, the pattern detection circuitry may further output an indication to select the SPI circuitry responsive to successfully detecting the signal pattern. Alternatively, the pattern detection circuitry may further output an indication to select the I2C circuitry responsive to failing to detect the signal pattern. In some aspects, as part of the signal pattern detection, the pattern detection circuitry may determine whether a number of transitions from a logic high voltage level to a logic low voltage level (e.g., corresponding to negative edges) in a signal received at the third connection port (shared by the SPI CS port) satisfies a threshold number of negative voltage transitions. Stated differently, the switching from the I2C mode and the SPI mode may be based on negative edges in an SPI CS signal. In some aspects, the threshold number of negative voltage transitions for detecting the signal pattern is a predetermined value (e.g., greater than 1). In some aspects, the threshold number of negative voltage transitions for detecting the signal pattern is based on a value stored at a register memory of the IC device. In some aspects, the IC device may operate (by default) using the I2C interface upon a power on reset and the value stored at the register memory (for the threshold number of negative voltage transitions) may be received via the I2C circuitry after the power reset.

In some aspects, the SPI circuitry may include two data ports, a master out, slave in (MOSI) port and a master in, slave out (MISO) port, and the SPI data port sharing the second connection port with the I2C data port may correspond to the MISO port. For example, the MISO port may be electrically coupled to a fourth connection port of the IC device. In some aspects, when the interface circuitry operates in the I2C mode, the fourth connection port (e.g., an MOSI pin) can be used or reconfigured (or reused) as a general-purpose input/output (GPIO) pin. Additionally or alternatively, when the interface circuitry operates in the I2C mode, the third connection port (e.g., a CS pin) can be used or reconfigured as an I2C address pin.

The systems, schemes, and mechanisms described herein advantageously eliminate the use of a dedicated pin for selecting between an SPI and an I2C interface in a an IC device supporting selectable SPI or I2C interface communication protocol. Accordingly, the disclosed embodiments can provide pin-count reduction, and thus can be beneficial to IC devices with a small die size and limited available pinouts. Defaulting the IC device to an I2C mode upon power-up and utilizing a CS signal pattern based on negative edges as an indication to switch from an I2C mode to an SPI mode can minimize or avoid a false mode switch detection. Allowing another device (e.g., a controller) to configure or program a register at the device for setting a threshold negative voltage transition count for CS signal pattern detection can provide flexibility. Reusing the SPI CS and/or SPI MOSI pins or connections respectively as GPIO and/or I2C address can further provide pin-count saving. While the pin-sharing mechanisms are discussed in the context of a multiprotocol communication interface with SPI and I2C, the disclosed mechanism can be applied to any other suitable multiprotocol communication interface. Further, the SPI/I2C pin-sharing or mode selection mechanisms discussed herein are applicable to any suitable IC devices including, but not limited to, sensors, audio devices, ADCs, DACs, memory devices, radio frequency (RF) devices, RF transceivers, optical devices, optical transceivers, optical modulators, laser controllers, and/or optical controllers.

FIG. 1 is a schematic diagram of an exemplary IC device 100 that implements an efficient SPI/I2C pin-sharing scheme, according to various embodiments of the present disclosure. The IC device 100 may be a slave device for communication with a microcontroller (MCU) 104 or any suitable controller or master device, for example, via a serial data bus (e.g., an SPI bus or I2C bus) on a circuit board in which the IC device 100 and the MCU 104 are disposed. As shown in FIG. 1, the IC device 100 may include interface circuitry 110 and four connection ports (shown as 112, 114, 116, and 118), which may be referred to as terminals or pins. The interface circuitry 110 may include SPI/I2C mode detection circuitry 120, SPI circuitry 130 (which may simply be referred to as an SPI), I2C circuitry 140 (which may simply be referred to as an I2C interface), selection circuitry 150, and a register memory 160. For simplicity, FIG. 1 only illustrates elements salient for interfacing with the MCU 104, and the IC device 100 may include other circuit elements and/or modules.

As further shown in FIG. 1, the SPI circuitry 130 may include a CS port 132, an SPI data port 134, an SPI clock port 136, and another SPI data port 138. The SPI data port 134 may be referred to as an MOSI port, the SPI data port 138 may be referred to as an MISO port, and the SPI clock port 136 may be referred to as a serial clock (SCLK) port. The SPI circuitry 130 may perform communication according to an SPI communication protocol. For instance, the CS port 132 may be used by the MCU 104 to select the SPI circuitry 130 for communication. The SPI clock port 136 may be used by the MCU 104 to provide a clock signal 135 to the SPI circuitry 130 for communication. The SPI data port 134 may be used for communicating data (e.g., one bit at a time) from the MCU 104 to the IC device 100. For example, the IC device 100 may sample a data signal 133 on the signal line 106 according to the rising edges or falling edges of the clock signal 135. The SPI data port 138 may be used for communicating data (e.g., one bit at a time) from the IC device 100 to the MCU 104. For example, the IC device 100 may transmit a data signal 137 on the signal line 108 according to the rising edges or falling edges of the clock signal 135.

As further shown in FIG. 1, the I2C circuitry 140 may include an I2C clock port 142 and an I2C data port 144, which may be referred to as a serial clock (SCL) port and a serial data (SDA) port 144, respectively. The I2C circuitry 140 may perform communication according to an I2C communication protocol. For instance, the I2C clock port 142 may be used by the MCU 104 to provide a clock signal 135 to the IC device 100. The I2C data port 144 may be used for communicating data (e.g., a data signal 137) from the MCU 104 to the IC device 100 or from the IC device 100 to the MCU 104. That is, the signal line 108 may be bidirectional in the I2C mode, where one of the MCU 104 or the IC device 100 may operate in a transmit mode at any given time.

To reduce a number of IC pins (or connection ports) for interfacing with the MCU 104, the SPI circuitry 130 and the I2C circuitry 140 may share some pins. For example, the I2C data port 144 and the SPI data port 138 may be electrically coupled to the connection port 118 via a signal line 108. That is, the I2C data port 144 and the SPI data port 138 may share the connection port 118 for data communication, where a data line of the SPI/I2C mode detection circuitry 120 and a data line of the I2C circuitry 140 may be coupled to the connection port 118. In a similar way, the I2C clock port 142 and the SPI clock port 136 may be electrically coupled to the connection port 116 via a signal line 107. That is, the I2C clock port 142 and the SPI clock port 136 may share the connection port 116 for clock signal communication, where a clock line of the SPI circuitry 130 and a clock line of the I2C circuitry 140 may be coupled to the connection port 116. Further, as will be discussed in greater detail, the connection port 112 may be electrically coupled to the CS port 132 and an input of the SPI/I2C mode detection circuitry 120 via the signal line 105 to avoid having to add a dedicated pin for selecting between the SPI circuitry 130 and the I2C circuitry 140. In some instances, the signal line 105 may be referred to as a CS line.

The SPI/I2C mode detection circuitry 120 may perform mode detection, or more specifically, signal pattern detection, to determine whether to select the SPI circuitry 130 or the I2C circuitry 140 for communicating with the MCU 104 based on a signal 131 received on the signal line 105. Responsive to the signal pattern detection, the SPI/I2C mode detection circuitry 120 may generate an output 122 (e.g., a selection signal) and provide the selection signal 122 to the selection circuitry 150. In some instances, the SPI/I2C mode detection circuitry 120 may be referred to as pattern detection circuitry. As shown in FIG. 1, the selection circuitry 150 may include a first input coupled to an output of the SPI circuitry 130, a second input coupled to an output of the I2C circuitry 140, a selection input coupled to an output of the SPI/I2C mode detection circuitry 120, and an output coupled to a data path 109, for reading from and/or writing to a register memory 160 of the IC device. The selection circuitry 150 (e.g., a multiplexer) may selectively couple the SPI circuitry 130 or the I2C circuitry 140 to the data path 109 responsive to an output (e.g., the selection signal 122) of the SPI/I2C mode detection circuitry 120. In some examples, the data path 109 may carry multiple signals, for example, a write enable signal, a read enable signal, a write data signal, a read data signal, a write address signal, and a read address signal. The read address signal may carry the address of a memory (or register) from which data (e.g., 8-bits, 16-bits, 32-bits, etc.) is to be read, the read data signal may carry the data read from the memory, and the read enable signal may control the read transfer (e.g., the data is on the read data line when the read enable signal is a logic high). Similarly, the write address signal may carry the address of a memory (or register) to which data (e.g., 8-bits, 16-bits, 32-bits, etc.) is to be written, the write data signal may carry the data for writing to the memory, and the write enable signal may control when the data is to be read (e.g., the data may be present on the data line when the write enable signal is a logic high).

In some aspects, the SPI/I2C mode detection circuitry 120 may monitor the CS line 105 for a signal pattern. For instance, the MCU 104 may trigger a mode switch from I2C to SPI by transmitting a signal pattern including a sequence of one or more negative edges (or toggles from a logic high to a logic low). Accordingly, as part of the signal pattern detection, the SPI/I2C mode detection circuitry 120 may receive a signal 131 (shared by the SPI CS port 132) and may determine whether a number of transitions from a logic high voltage level to a logic low voltage level (e.g., falling edges or negative edges) in the signal 131 satisfies a threshold number of negative voltage transitions. Stated differently, the switching between the I2C mode and the SPI mode may be based on negative edges in the CS signal 131. In an example, if the SPI/I2C mode detection circuitry 120 successfully detected the signal pattern, the SPI/I2C mode detection circuitry 120 may output an indication (e.g., the selection signal 122, which may also be referred to as an SEL SPI signal) to select the SPI circuitry. If, however, the SPI/I2C mode detection circuitry 120 fails to detect the signal pattern, the SPI/I2C mode detection circuitry 120 may output an indication to select the I2C circuitry 140. In an example, the SPI/I2C mode detection circuitry 120 may output a logic 1 to indicate a selection for the SPI circuitry 130 and a logic 0 to indicate a selection for the I2C circuitry 140, or vice versa. In some instances, the CS signal pattern for switching the communication mode from I2C to SPI may be referred to as a dummy CS pattern since the signal pattern may not contribute to chip select or serial data communication.

In some aspects, when the interface circuitry 110 utilizes the I2C circuitry 140 for communication with the MCU 104, the connection port 114 coupled to the MISO port 134 of the SPI circuitry 130 can be reconfigured to operate as a GPIO pin. That is, the connection port 114 can be repurposed (or reused) for other signal communication. Additionally or alternatively, when the interface circuitry 110 utilizes the I2C circuitry 140 for communication with the MCU 104, the connection port 112 (coupled to the CS port 132 of the SPI circuitry 130) may be reconfigured to operate as an I2C address pin. As an example, a board or a system may include two IC devices 100 communicating with the MCU 104, where the I2C circuitry 140 in both of the IC devices 100 may have the same I2C addresses (e.g., a 7-bit address or a 10-bit address). By reusing the connection port 112 as an address pin, the MCU 104 may select one of the IC devices 100 by sending a logic high to the connection port 112 of the respective IC device 100 or select the other one of the IC devices 100 by sending a logic low to the connection port 112 of the respective IC device 100. Stated differently, the connection port 112 can be reused to represent a bit in an I2C address. For example, a 7-bit I2C address as assigned to the IC device 100 may be combined with the additional bit (received from the connection port 112) to provide an 8-bit I2C address for communicating with the MCU 104.

While the IC device 100 shown in FIG. 1 illustrates the I2C circuitry 140 sharing the connection port 118 (coupled to the MOSI port 138 of the SPI circuitry 130) for data communication, in some examples, the I2C circuitry 140 can share the connection port 114 (coupled to the MISO port 134 of the SPI circuitry 130) for data communication.

FIGS. 2-6 are discussed in relation to FIG. 1 to provide a more detailed view of the signal pattern detection and SPI/I2C selection process performed by the SPI/I2C mode detection circuitry 120.

Figure 2:
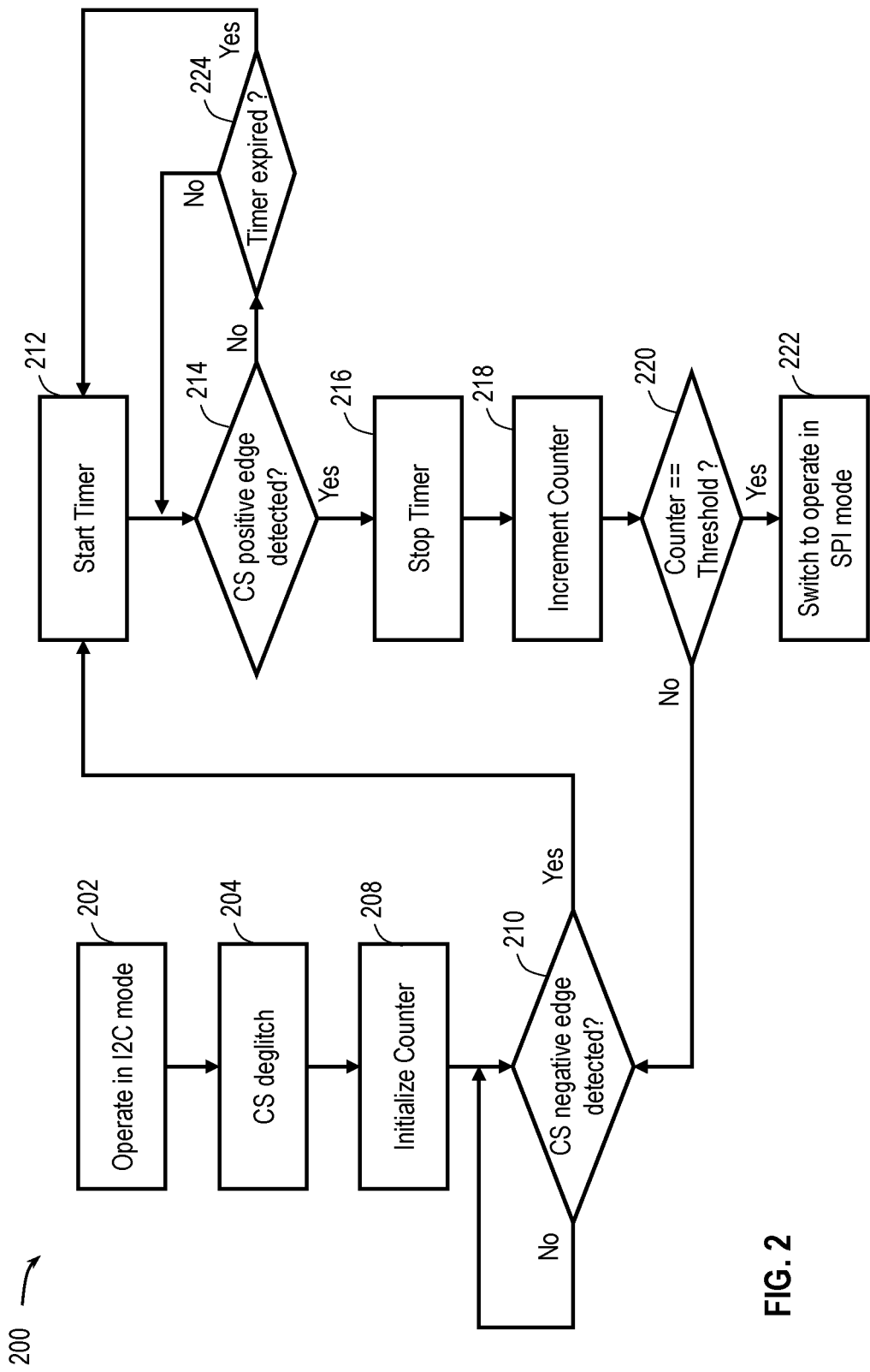
FIG. 2 is a flow diagram of an exemplary method for SPI/I2C mode detection and selection, according to various embodiments of the present disclosure.

FIG. 2 is a flow diagram of an exemplary method 200 for SPI/I2C mode detection and selection, according to various embodiments of the present disclosure. The method 200 may be implemented by the interface circuitry 110 or any suitable signal pattern detection circuitries. Although the operations of the method 200 may be illustrated with reference to particular embodiments of the SPI/I2C mode detection circuitry 120 disclosed herein, the method 200 may be performed using any suitable hardware components and/or software components. Operations are illustrated once each and in a particular order in FIG. 2, but the operations may be performed in parallel, reordered, and/or repeated as desired.

At 202, the interface circuitry 110 may operate in an I2C mode using the I2C circuitry 140 for communication. For example, the interface circuitry 110 may operate in an I2C mode by default after power-up.

At 204, the interface circuitry 110 may perform CS deglitch. As discussed above, the interface circuitry 110 may monitor a CS signal 131 on the CS line 105 for a signal pattern to determine whether to select the SPI circuitry 130 or the I2C circuitry 140 for communication. To avoid glitches on the CS line 105 causing a false detection, the interface circuitry 110 may utilize signal deglitch circuitry (e.g., the deglitch circuitry 510 shown in FIG. 5) to remove signal glitches on the CS line 105 prior to the signal pattern detection.

As discussed above, the signal pattern detection may be based on counting a number of negative edges in the CS signal 131 on the CS line 105. Thus, at 208, the SPI/I2C mode detection circuitry 120 may initialize a counter, for example, to a value of 0, to begin the detection.

At 210, the SPI/I2C mode detection circuitry 120 may determine whether a CS negative edge (e.g., a negative voltage transition from a logic high to a logic low) in the CS signal 131 is detected. If the SPI/I2C mode detection circuitry 120 fails to detect a CS negative edge in the CS signal 131, the SPI/I2C mode detection circuitry 120 may continue to monitor for a CS negative edge and continue to output an indication to select the I2C circuitry 140 for communication. If, however, the SPI/I2C mode detection circuitry 120 successfully detected a CS negative edge in the CS signal 131, the SPI/I2C mode detection circuitry 120 may proceed to 212.

After detecting the CS negative edge, the SPI/I2C mode detection circuitry 120 may monitor for a CS positive edge (e.g., a positive voltage transition from a logic low to a logic high). For example, at 212, the SPI/I2C mode detection circuitry 120 may start a timer. The timer may be used to timeout the CS positive edge detection.

At 214, the SPI/I2C mode detection circuitry 120 may determine whether a CS positive edge is detected in the CS signal 131. If the SPI/I2C mode detection circuitry 120 fails to detect a CS positive edge in the CS signal 131, the SPI/I2C mode detection circuitry 120 may proceed to 224.

At 224, the SPI/I2C mode detection circuitry 120 may determine whether the timer has expired. If the timer has expired, the SPI/I2C mode detection circuitry 120 may return to 212 and restart the timer. If, however, the timer has not expired, the SPI/I2C mode detection circuitry 120 may continue to monitor for a CS positive edge and continue to output an indication to select the I2C circuitry 140 for communication.

Returning to 214, if the SPI/I2C mode detection circuitry 120 successfully detected a CS positive edge in the CS signal 131, the SPI/I2C mode detection circuitry 120 may proceed to 216 to stop the timer.

At 218, after successfully detecting a CS negative edge followed by a CS positive edge in the CS signal 131, the SPI/I2C mode detection circuitry 120 may increment the counter.

At 220, the SPI/I2C mode detection circuitry 120 may determine whether the incremented counter satisfies a threshold (e.g., equals to the threshold). If the counter fails to satisfy the threshold, the SPI/I2C mode detection circuitry 120 may return to 210 and continue to monitor the CS signal 131 for a CS negative edge. If, however, the counter satisfies the threshold, the SPI/I2C mode detection circuitry 120 may proceed to 222.

At 222, the SPI/I2C mode detection circuitry 120 may cause the interface circuitry 120 to operate in the SPI mode. For example, the SPI/I2C mode detection circuitry 120 may generate a selection signal 122 including an indication to select the SPI circuitry 130 for communication so that the selection circuitry 150 may couple the output of the SPI circuitry 130 to the data path 109.

In some aspects, the threshold used at 220 may be a predetermined value (e.g., 1, 2, 3, 4, 5 or more). For example, if the signal pattern for indicating a switch from the I2C mode to the SPI mode may include 5 negative voltage transitions, the threshold may be set to a fixed value of 5. In other aspects, the threshold used at 220 may be based on a value stored at the register memory 160. For instance, the signal pattern for switching from the I2C mode to the SPI mode may be configurable. As an example, the MCU 104 may configure the register with a desired threshold for switching from the I2C mode to the SPI mode using the I2C circuitry 140 upon power-up.

FIG. 3 is a timing diagram illustrating exemplary operations in SPI/I2C mode detection, according to various embodiments of the present disclosure. As shown in FIG. 3, the CS signal 131 on the CS line 105 may transition from a logic high to a logic low (shown by the falling edge or signal edge 301 with the down-arrow) and subsequently transition from a from a logic low to a logic high (shown by the rising edge or signal edge 303 with the up-arrow). The CS negative edge detection performed by the SPI/I2C mode detection circuitry 120 at 210 of the method 200 of FIG. 2 may be monitoring for the negative edge 301. The CS positive edge detection performed by the SPI/I2C mode detection circuitry 120 at 214 of the method 200 of FIG. 2 may be monitoring for the positive edge 303.

As further shown in FIG. 3, a timer 302 may be used for counting the number of clock cycles elapsed between the CS negative edge 301 and the CS positive edge 303. The timer 302 may be based on an internal clock (e.g., an oscillator) of the IC device 100. The timer 302 may correspond to the timer discussed at 212, 216, and 224 of the method 200 of FIG. 2. In the illustrated example of FIG. 3, the timer may increment by 1 for each internal clock cycle, and there may be N1 number of clock cycles elapsed from the time the CS negative edge 301 is detected (by the SPI/I2C mode detection circuitry 120) to the time the CS positive edge 303 is detected (by the SPI/I2C mode detection circuitry 120). In an example, the threshold for determining whether a signal pattern is detected for a mode switch may be set based on a maximum duration during which the CS signal 131 may stay at a logic low. The maximum duration may be converted to a number of clock cycles (internal clock cycles) for setting the threshold. The use of the timer 302 to restart the negative edge detection upon a timeout can advantageously avoid a false detection of a CS negative edge.

FIG. 4 is a timing diagram illustrating exemplary operations in SPI/I2C mode detection, according to various embodiments of the present disclosure. As shown in FIG. 4, the CS signal 131 on the CS line 105 may toggled between logic high and logic low, for example, by the MCU 104 to indicate a mode switch from the I2C mode to the SPI mode. Similar to FIG. 3, CS negative edges are shown by the signal edges with the down-arrows and CS positive edges are shown by the signal edges with the up-arrows.

As further shown in FIG. 4, a counter 402 may be used to count the number of CS negative edges (or negative voltage transitions) from a logic high to a logic low. The counter 402 may correspond to the counter discussed at 208, 218, and 220 of the method 200 of FIG. 2. For example, the counter 402 is incremented by 1 for each detected CS negative edges. In the illustrated example of FIG. 4, the threshold count may be set to N2. Accordingly, when the counter reaches N2 (e.g., at time T1), the SPI/I2C mode detection circuitry 120 may generate a logic 1 for the SEL SPI signal 122. As shown by the interface communication mode 404, the SPI/I2C mode detection circuitry 120 may communicate in the I2C mode 406 (e.g., using the I2C circuitry 140) at time T0, upon power up, and switch to the communicate in the SPI mode 408 (e.g., using the SPI circuitry 130) at time T1. Using a signal pattern with a number of negative edges to indicate a mode switch from I2C to SPI can advantageously avoid a false mode switch detection.

While not shown in FIG. 4, the timer 302 of FIG. 3 can be used to limit the duration of time during which the CS signal 131 may stay at a logic low after a negative edge as discussed above with reference to FIGS. 2-3.

Figure 5:
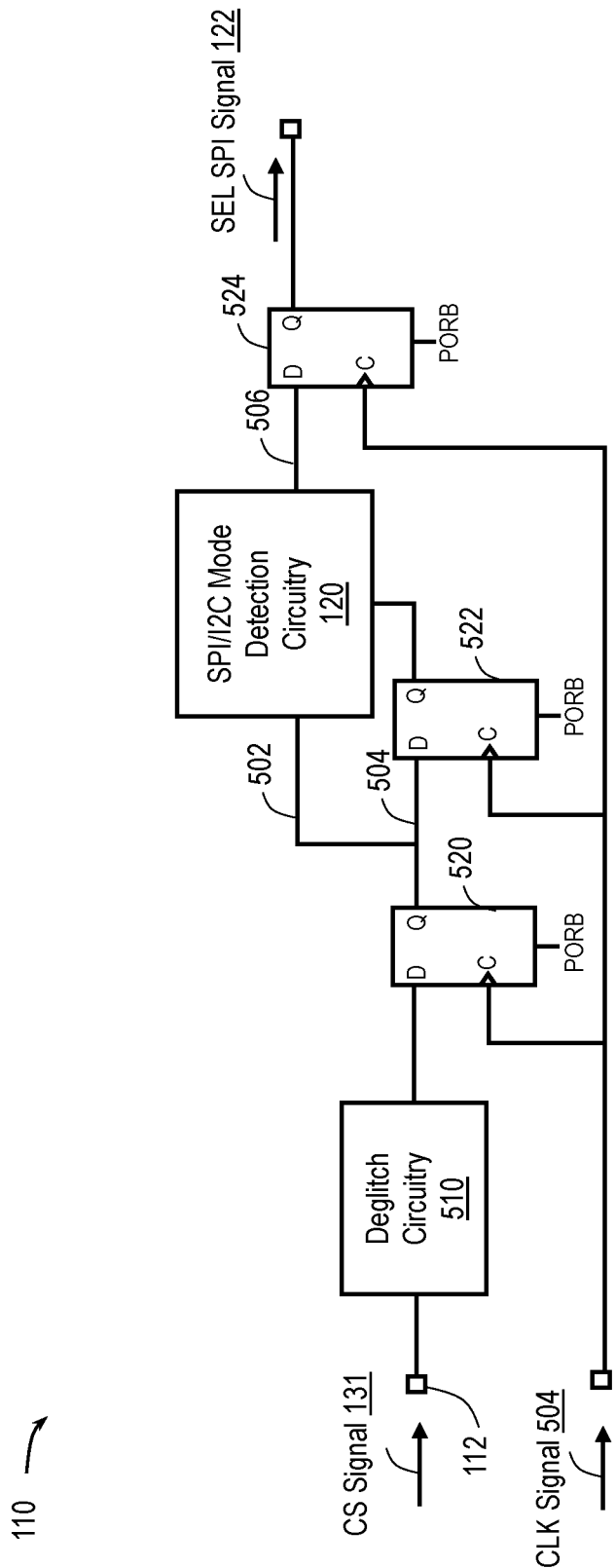
FIG. 5 is a schematic diagram of a portion of exemplary interface circuitry in an IC device that implements an efficient SPI/I2C pin-sharing scheme, according to various embodiments of the present disclosure.

FIG. 5 is a schematic diagram of a portion of the interface circuitry 110 in an IC device 100, according to various embodiments of the present disclosure. FIG. 5 may provide an exemplary implementation for the interface circuitry 110. For simplicity, FIG. 5 may only illustrate elements that are relevant for SPI/I2C mode detection. As shown in FIG. 5, the interface circuitry 110 may include deglitch circuitry 510, SPI/I2C mode detection circuitry 120, and D-flip-flops (DFFs) 520, 522, and 524.

The deglitch circuitry 510 may be coupled to the connection port 112 to receive a CS signal 131 (from a master device such as the MCU 104) and remove glitches on the CS signal 131. The deglitch circuitry 510 may include any circuit elements, such as delay block, logic gates, set-reset (SR) latches, etc., suitable for removing the signal glitches.

The DFFs 520 and 522 may operate together for negative edge detection and positive edge detection. As shown, both the DFFs 520 and 522 may be reset by an inverted power-on-reset signal, denoted by PORB. The data input port, denoted by D, of the DFF 520 may be coupled to the output of the deglitch circuitry 510 to receive the CS signal 131 after glitch removal. The clock port, denoted by C, of the DFF 520 may be coupled to a clock signal 504 (e.g., generated by an internal clock or oscillator of the IC device 100). The output port, denoted by Q, of the DFF 520 may be coupled to a data port (D) of the DFF 522 and provided as an input to the SPI/I2C mode detection circuitry 120. The clock port (C) of the DFF 522 may be coupled to the same clock signal 504, and the output port (Q) of the DFF 522 may be provided as another input to the SPI/I2C mode detection circuitry 120. That is, the DFF 520 may provide a version of the CS signal 131 (e.g., a signal 502) to the SPI/I2C mode detection circuitry 120 and the DFF 522 may provide a signal 504 corresponding to a delayed version of the signal 502 to the SPI/I2C mode detection circuitry 120. In some examples, using 2 versions of the same signal delayed from one another can advantageously improve signal edge detections. The SPI/I2C mode detection circuitry 120 may generate an output signal 506 based on the signal detection performed as discussed above with reference to FIGS. 2-4. The DFF 524 may be reset by an inverted clock signal 504 and may clock the output signal 506 according to the clock signal 504 to provide a selection signal 122 (denoted by SEL SPI signal), for example, to the selection circuitry 150.

Figure 6:
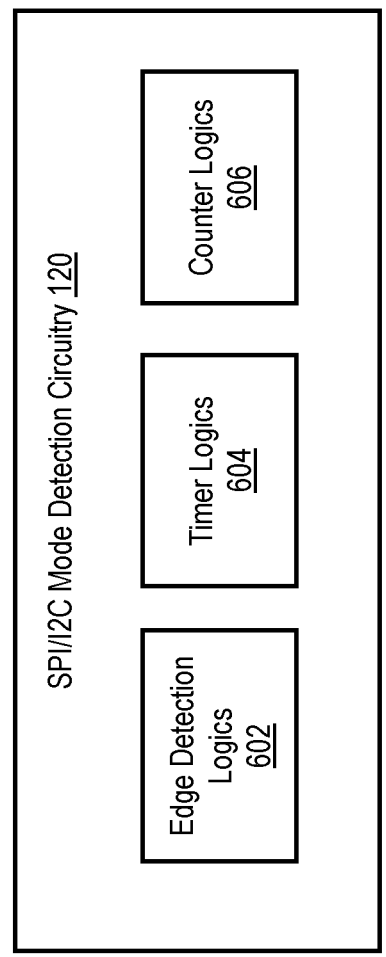
FIG. 6 is a schematic diagram of an exemplary SPI/I2C mode detection circuitry, according to various embodiments of the present disclosure.

FIG. 6 is a schematic diagram of an exemplary SPI/I2C mode detection circuitry 120, according to various embodiments of the present disclosure. FIG. 6 may provide an exemplary implementation of the SPI/I2C mode detection circuitry 120. As shown in FIG. 6, the SPI/I2C mode detection circuitry 120 may include edge detection logics 602, timer logics 604, and counter logics 606. In general, the edge detection logics 602, the timer logics 604, and the counter logics 606 can include logic gates, flip-flops, SR latches, delay buffers, etc.

In an aspect, the edge detection logics 602 may detect falling or negative edges and rising or positive edges in a CS signal 131 on the CS line 105 as discussed above with reference to FIGS. 2-5. For example, the edge detection logics 602 may detect the falling edges (e.g., the falling edge 301) and/or the rising edges (e.g., the rising edge 303) shown in FIGS. 3 and 4. The timer logics 604 may implement the timer (e.g., the timer 302) as discussed above with reference to FIGS. 2-3. For example, the timer logics 604 may be used to cause the edge detection logics 602 to repeat detection of a negative edge in the CS signal 131 on the CS line 105 upon failing to detect a positive edge transition within a duration subsequent to a negative edge detection. The counter logics 606 may implement the counter (e.g., the counter 402) as discussed above with reference to FIGS. 2 and 4. For example, the counter logics 606 may increment a counter upon successfully detecting a negative edge followed by a positive edge in the CS signal 131 on the CS line 105.

Figure 7:
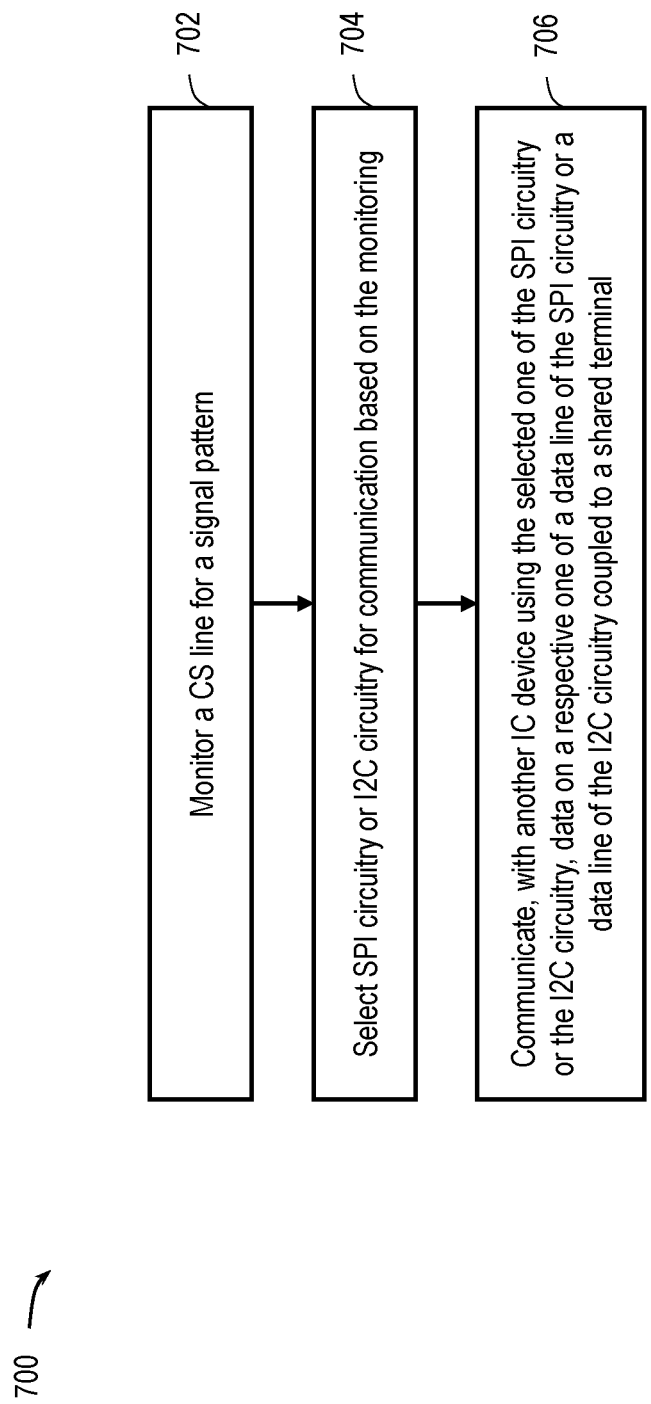
FIG. 7 is a flow diagram of an exemplary method for operating an IC device that implements an efficient SPI/I2C pin-sharing scheme, according to various embodiments of the present disclosure.

FIG. 7 is a flow diagram of an exemplary method 700 for operating an IC device that implements an efficient SPI/I2C pin-sharing scheme, according to various embodiments of the present disclosure. For example, the method 700 may be implemented by an IC device, such as the IC device 100 of FIG. 1. The IC device may have SPI circuitry (e.g., the SPI circuitry 130), I2C circuitry (e.g., the I2C circuitry 140), a first terminal (e.g., the connection port 112) coupled to a CS line of the SPI circuitry, a second terminal (e.g., the connection port 118) coupled to a data line of the SPI circuitry and a data line of the I2C circuitry, and a third terminal (e.g., the connection port 116) coupled to a clock line of the SPI circuitry and a clock line of the I2C. Although the operations of the method 700 may be illustrated with reference to particular embodiments of the IC device 100 disclosed herein, the method 700 may be performed using any suitable hardware components and/or software components. Operations are illustrated once each and in a particular order in FIG. 7, but the operations may be performed in parallel, reordered, and/or repeated as desired.

At 702, the IC device may monitor the CS line for a signal pattern. In some aspects, as part of monitoring the CS line, the IC device may count a number of negative edges in a signal received on the CS line. In some aspects, as part of the counting, the IC device may increment a counter responsive to detecting a positive edge subsequent to a negative edge in the signal received on the CS line.

At 704, the IC device may select the SPI circuitry or the I2C circuitry for communication based on the monitoring. In some aspects, as part of selecting the SPI circuitry or the I2C circuitry, the IC device may compare the number of negative edges in the signal received on the CS line to a threshold number of negative edges and perform the selection based on the comparison. In some aspects, the selecting may include selecting the SPI circuitry for communication responsive to the number of negative edges in the signal received on the CS line satisfies the threshold number of negative edges. In some aspects, the selecting may include selecting the I2C circuitry for communication responsive to the number of negative edges in the signal received on the CS line fails to satisfy the threshold number of negative edges. In some aspects, the threshold number of negative edges for the comparison in the selecting the SPI circuitry or the I2C circuitry may be predetermined (e.g., a fixed value). In other aspects, the threshold number of negative edges for the comparison in the selecting the SPI circuitry or the I2C circuitry is based on a register read (e.g., reading from a configuration register of the IC device). In a further aspect, the threshold number of negative edges for the comparison in the selecting is read, using the I2C circuitry from the other device and stored in a register.

At 706, the IC device may communicate, with another IC device (e.g., the MCU 104) using the selected one of the SPI circuitry or the I2C circuitry, data on a respective one of the data line of the SPI circuitry or the data line of the I2C circuitry coupled to the second terminal.

Figure 8:
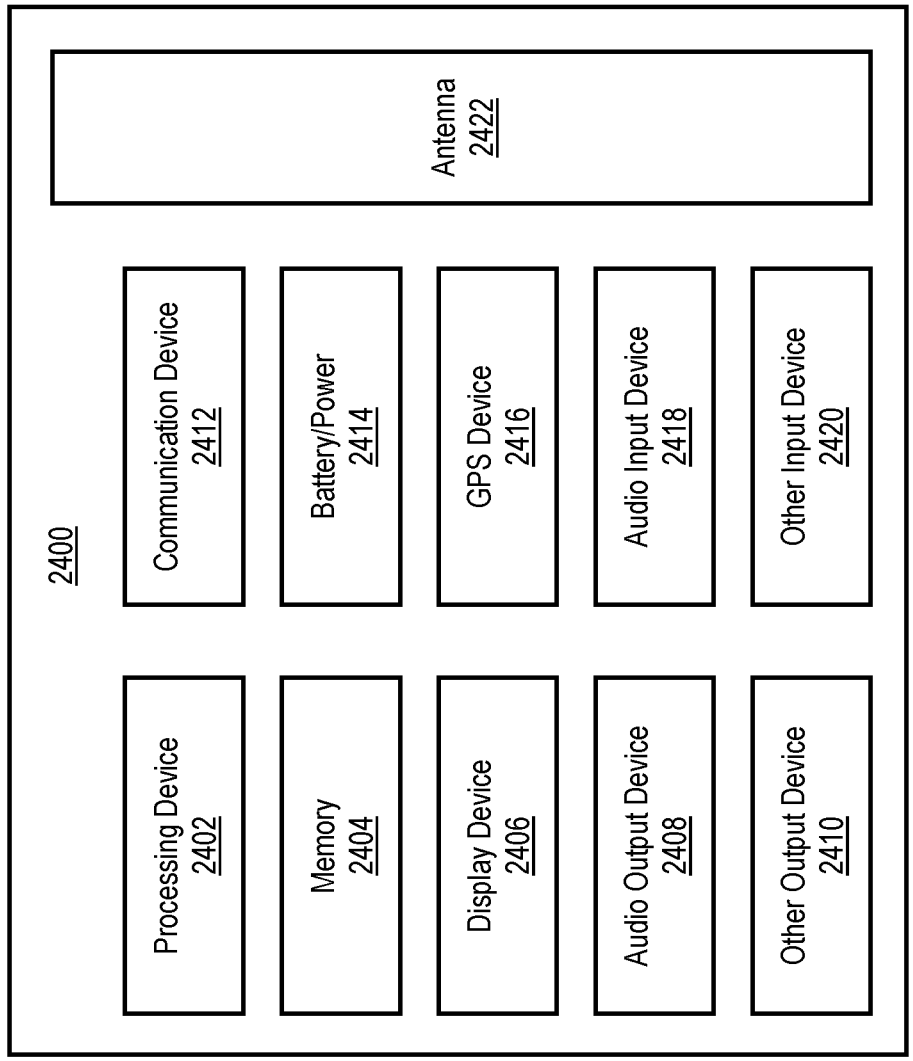
FIG. 8 is a block diagram of an exemplary electrical device that may include any of the SPI/I2C interface circuitries with SPI/I2C pin-sharing disclosed herein.

FIG. 8 is a block diagram of an exemplary electrical device 2400 that may include any of the interface circuitries 110 with SPI/I2C pin-sharing disclosed herein, or may include on or more components that perform any of the methods 200 and 700 disclosed herein. For example, at least some of the device(s) or components of the device 2400 may include the interface circuitry 110 as discussed above with reference to FIGS. 1 and 5-6. A number of components are illustrated in FIG. 8 as included in the device 2400, but any one or more of these components may be omitted or duplicated, as suitable for the application. In some embodiments, some or all of the components included in the electrical device 2400 may be attached to one or more motherboards. In some embodiments, some or all of these components may be fabricated onto a single system-on-a-chip (SoC) die.

Additionally, in various embodiments, the device 2400 may not include one or more of the components illustrated in FIG. 8, but the device 2400 may include interface circuitry for coupling to the one or more components. For example, the device 2400 may not include a display device 2406, but may include display device interface circuitry (e.g., a connector and driver circuitry) to which a display device 2406 may be coupled. In another set of examples, the device 2400 may not include an audio input device 2418 or an audio output device 2408, but may include audio input or output device interface circuitry (e.g., connectors and supporting circuitry) to which an audio input device 2418 or audio output device 2408 may be coupled.

The device 2400 may include a processing device 2402 (e.g., one or more processing devices). As used herein, the term "processing device" or "processor" may refer to any device or portion of a device that processes electronic data from registers and/or memory to transform that electronic data into other electronic data that may be stored in registers and/or memory. The processing device 2402 may include one or more digital signal processors (DSPs), application-specific integrated circuits (ASICs), central processing units (CPUs), graphics processing units (GPUs), cryptoprocessors (specialized processors that execute cryptographic algorithms within hardware), server processors, or any other suitable processing devices.

In some embodiments, the electrical device 2400 may include a memory 2404, which may itself include one or more memory devices such as volatile memory (e.g., dynamic random access memory (DRAM)), nonvolatile memory (e.g., read-only memory (ROM)), flash memory, solid state memory, and/or a hard drive. In some embodiments, the memory 2404 may include memory that shares a die with the processing device 2402. This memory 2404 may be used as cache memory and may include embedded dynamic random access memory (eDRAM) or spin transfer torque magnetic random access memory (STT-MRAM).

In some embodiments, the electrical device 2400 may include a communication device 2412 (e.g., one or more communication devices). For example, the communication device 2412 may be configured for managing wireless communications for the transfer of data to and from the electrical device 2400. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not The communication device 2412 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The one or more communication chips 2412 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The one or more communication chips 2412 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The one or more communication chips 2412 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication device 2412 may operate in accordance with other wireless protocols in other embodiments. The device 2400 may include an antenna 2422 to facilitate wireless communications and/or to receive other wireless communications (such as AM or FM radio transmissions).

In some embodiments, the communication device 2412 may manage wired communications using a protocol. Wired communications may include electrical, optical, or any other suitable communication protocols. Examples of wired communication protocols that may be enabled by the communication device 2412 include Ethernet, controller area network (CAN), I2C, media-oriented systems transport (MOST), or any other suitable wired communication protocol.

As noted above, the communication device 2412 may include multiple communication devices. For instance, a first communication device 2412 may be dedicated to shorter-range wireless communications such as Wi-Fi or Bluetooth, and a second communication device 2412 may be dedicated to longer-range wireless communications such as global positioning system (GPS), EDGE, GPRS, CDMA, WiMAX, LTE, EV-DO, or others. In some embodiments, a first communication device 2412 may be dedicated to wireless communications, and a second communication device 2412 may be dedicated to wired communications.

The device 2400 may include battery/power circuitry 2414. The battery/power circuitry 2414 may include one or more energy storage devices (e.g., batteries or capacitors) and/or circuitry for coupling components of the device 2400 to an energy source separate from the device 2400 (e.g., AC line power, voltage provided by a car battery, etc.).

The device 2400 may include a display device 2406 (or corresponding interface circuitry, as discussed above). The display device 2406 may include any visual indicators, such as a heads-up display, a computer monitor, a projector, a touchscreen display, a liquid crystal display (LCD), a light-emitting diode display, or a flat panel display, for example.

The device 2400 may include an audio output device 2408. The audio output device 2408 may include any device that generates an audible indicator, such as speakers, headsets, or earbuds, for example.

The device 2400 may include an audio input device 2418 (or corresponding interface circuitry, as discussed above). The audio input device 2418 may include any device that generates a signal representative of a sound, such as microphones, microphone arrays, or digital instruments (e.g., instruments having a musical instrument digital interface MIDI output).

The device 2400 may include a GPS device 2416 (or corresponding interface circuitry, as discussed above). The GPS device 2416 may be in communication with a satellite-based system and may receive a location of the device 2400, as known in the art.

The device 2400 may include another output device 2410 (or corresponding interface circuitry, as discussed above). Examples of the other output device 2410 may include an audio codec, a video codec, a printer, a wired or wireless transmitter for providing information to other devices, or an additional storage device. Additionally, an IC device 100 discussed herein may be included in the other output device 2410.

The device 2400 may include another input device 2420 (or corresponding interface circuitry, as discussed above). Examples of the other input device 2420 may include an accelerometer, a gyroscope, an image capture device, a keyboard, a cursor control device such as a mouse, a stylus, a touchpad, a bar code reader, a Quick Response (QR) code reader, or a radio frequency identification (RFID) reader. Any suitable ones of the display, input, output, communication, or memory devices described above with reference to the device 2400 may serve as the IC device 100 of FIG. 1. Alternatively or additionally, any suitable ones of the display, input, output, communication, or memory devices described above with reference to the device 2400 may be included in a controller or a node (e.g., a master MCU 104 or a slave IC device 100).

The device 2400 may have any desired form factor, such as a handheld or mobile electrical device (e.g., a cell phone, a smart phone, a mobile internet device, a music player, a tablet computer, a laptop computer, a netbook computer, an ultrabook computer, a personal digital assistant (PDA), an ultra mobile personal computer, etc.), a desktop electrical device, a server device or other networked computing component, a printer, a scanner, a monitor, a set-top box, an entertainment control unit, a vehicle control unit, a digital camera, a digital video recorder, or a wearable electrical device. In some embodiments, the electrical device 2400 may be any other electronic device that processes data The following paragraphs provide various examples of the embodiments disclosed herein.

Example 1 includes an interface circuitry arrangement for communication between integrated circuit (IC) devices, the interface circuitry arrangement including serial peripheral interface (SPI) circuitry having an SPI clock port, an SPI data port, and an SPI chip select (CS) port; inter-integrated circuit (I2C) circuitry having an I2C clock port and an I2C data port, where the I2C clock port and the SPI clock port are electrically coupled to a first connection port, and where the I2C data port and the SPI data port are electrically coupled to a second connection port; pattern detection circuitry to detect a signal pattern at a third connection port, the third connection port electrically coupled to the SPI CS port; and selection circuitry to selectively couple the SPI circuitry or the I2C circuitry to a data path responsive to an output of the pattern detection circuitry.

In Example 2, the interface circuitry arrangement of Example 1 may optionally include where the pattern detection circuitry further outputs an indication to select the SPI circuitry responsive to successfully detecting the signal pattern.

In Example 3, the interface circuitry arrangement of any of Examples 1-2 may optionally include where the pattern detection circuitry further outputs an indication to select the I2C circuitry responsive to failing to detect the signal pattern.

In Example 4, the interface circuitry arrangement any of Examples 1-3 may optionally include where the pattern detection circuitry detects the signal pattern by determining whether a number of transitions from a logic high voltage level to a logic low voltage level in a signal received at the third connection port satisfies a threshold number of negative voltage transitions.

In Example 5, the interface circuitry arrangement any of Examples 1-4 may optionally include where the threshold number of negative voltage transitions for detecting the signal pattern is a predetermined value.

In Example 6, the interface circuitry arrangement any of Examples 1-4 may optionally include where the threshold number of negative voltage transitions for detecting the signal pattern is based on a value stored at a register memory.

In Example 7, the interface circuitry arrangement of Example 6 may optionally include where the I2C circuitry receives, via the I2C data port, the value on which the threshold number of negative voltage transitions is based, and where the received value is stored in the register memory.

In Example 8, the interface circuitry arrangement any of Examples 1-7 may optionally include where the interface circuitry arrangement selects the I2C circuitry for communication upon power on reset.

Example 9 includes an integrated circuit (IC) device including a register memory; interface circuitry coupled to the register memory, the interface circuitry including a serial peripheral interface (SPI); and an inter-integrated circuit (I2C) interface; a first terminal coupled to a chip select (CS) line of the SPI; a second terminal coupled to a first data line of the SPI; a third terminal coupled to a clock line of the SPI and a clock line of the I2C interface; a fourth terminal coupled to a second data line of the SPI and a data line of the I2C interface; mode detection circuitry coupled to the first terminal, where the mode detection circuitry monitors for one or more negative edges on the CS line of the SPI; and selection circuitry to selectively couple the SPI or the I2C interface to the register memory based on an output of the mode detection circuitry.

In Example 10, the IC device of Example 9 may optionally include where the mode detection circuitry further counts a number of negative edges in a signal on the CS line of the SPI based on the monitoring; and generates a selection signal for selecting the SPI or the I2C interface based on a comparison of the number of negative edges on the signal on the CS line against a threshold.

In Example 11, the IC device of any of Examples 9-10 may optionally include where the mode detection circuitry generates the selection signal by generating a first selection signal for selecting the I2C interface based on the number of negative edges in the signal on the CS line fails to satisfy the threshold; and generating a second selection signal for selecting the SPI based on the number of negative edges in the signal on the CS line satisfies the threshold.

In Example 12, the IC device of any of Examples 9-11 may optionally include where the mode detection circuitry includes edge detection logics to detect negative edges and positive edges in the signal on the CS line; and counter logics to increment a counter upon successfully detecting a negative edge followed by a positive edge in the signal on the CS line.

In Example 13, the IC device of any of Examples 9-12 may optionally include where the mode detection circuitry further includes timer logics to repeat detection of a negative edge in the signal on the CS line upon failing to detect a positive edge transition within a duration subsequent to a negative edge detection.

In Example 14, the IC device of any of Examples 9-13 may optionally include where the second data line of the SPI coupled to the fourth terminal in which the data line of the I2C interface is coupled to corresponds to a master input, slave output (MISO) line of the SPI.

In Example 15, the IC device of any of Examples 9-14 may optionally include where the first data line of the SPI coupled to the second terminal corresponds to a master output, slave input (MOSI) line of the SPI; and the second terminal operates as a general-purpose input/output (GPIO) terminal when the I2C interface is active.

In Example 16, the IC device of any of Examples 9-15 may optionally include where the first terminal coupled to the CS line of the SPI operates as an I2C address terminal when the I2C interface is active.

Example 17 includes a method performed by an integrated circuit (IC) device having serial peripheral interface (SPI) circuitry, inter-integrated circuit (I2C) circuitry, a first terminal coupled to a chip select (CS) line of the SPI circuitry, a second terminal coupled to a data line of the SPI circuitry and a data line of the I2C circuitry, and a third terminal coupled to a clock line of the SPI circuitry and a clock line of the I2C, the method including monitoring the CS line for a signal pattern; selecting the SPI circuitry or the I2C circuitry for communication based on the monitoring; and communicating, with another IC device using the selected one of the SPI circuitry or the I2C circuitry, data on a respective one of the data line of the SPI circuitry or the data line of the I2C circuitry coupled to the second terminal.

In Example 18, the method of Example 17 may optionally include where the monitoring the CS line for the signal pattern includes counting a number of negative edges in a signal received on the CS line; and the selecting is based a comparison of the number of negative edges in the signal received on the CS line to a threshold number of negative edges.

In Example 19, the method of any of Examples 17-18 may optionally include where the selecting includes selecting the SPI circuitry for communication responsive to the number of negative edges in the signal received on the CS line satisfies the threshold number of negative edges.

In Example 20, the method of any of Examples 17-19 may optionally include where the selecting includes selecting the I2C circuitry for communication responsive to the number of negative edges in the signal received on the CS line fails to satisfy the threshold number of negative edges.

In Example 21, the method of any of Examples 17-20 may optionally include where the threshold number of negative edges for the comparison in the selecting the SPI circuitry or the I2C circuitry is predetermined.

In Example 22, the method of any of Examples 17-20 may optionally include where the threshold number of negative edges for the comparison in the selecting the SPI circuitry or the I2C circuitry is based on a register read.

In Example 23, the method of Example 22 may optionally include receiving, using the I2C circuitry, a value for the threshold number of negative edges for the comparison in the selecting the SPI circuitry or the I2C circuitry.

In Example 24, the method of any of Examples 17-23 may optionally include where the counting the number of negative edges in a signal received on the CS line includes incrementing a counter responsive to detecting a positive edge subsequent to a negative edge in the signal received on the CS line.

Variations and Implementations

While embodiments of the present disclosure were described above with references to exemplary implementations as shown in FIGS. 1-7, a person skilled in the art will realize that the various teachings described above are applicable to a large variety of other implementations.

In certain contexts, the features discussed herein can be applicable to automotive systems, safety-critical industrial applications, medical systems, scientific instrumentation, wireless and wired communications, radio, radar, industrial process control, audio and video equipment, current sensing, instrumentation (which can be highly precise), and other digital-processing-based systems.

In the discussions of the embodiments above, components of a system, such as logics and interface circuitries, and/or other components can readily be replaced, substituted, or otherwise modified in order to accommodate particular circuitry needs. Moreover, it should be noted that the use of complementary electronic devices, hardware, software, etc., offer an equally viable option for implementing the teachings of the present disclosure related to communication interface circuitries with efficient pin-sharing, in various communication systems.

Parts of various systems for implementing interface circuitries with efficient pin-sharing as proposed herein can include electronic circuitry to perform the functions described herein. In some cases, one or more parts of the system can be provided by a processor specially configured for carrying out the functions described herein. For instance, the processor may include one or more application specific components, or may include programmable logic gates which are configured to carry out the functions describe herein. The circuitry can operate in analog domain, digital domain, or in a mixed-signal domain. In some instances, the processor may be configured to carrying out the functions described herein by executing one or more instructions stored on a non-transitory computer-readable storage medium.

In one example embodiment, any number of electrical circuits of the present figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of DSPs, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the present figures may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SoC) package, either in part, or in whole. An SoC represents an IC that integrates components of a computer or other electronic system into a single chip. It may contain digital, analog, mixed-signal, and often RF functions: all of which may be provided on a single chip substrate. Other embodiments may include a multi-chip-module (MCM), with a plurality of separate ICs located within a single electronic package and configured to interact closely with each other through the electronic package.

It is also imperative to note that all of the specifications, dimensions, and relationships outlined herein (e.g., the number of components of the interface circturies shown in FIGS. 1 and 5-6) have only been offered for purposes of example and teaching only. Such information may be varied considerably without departing from the spirit of the present disclosure, or the scope of the appended claims. It should be appreciated that the system can be consolidated in any suitable manner. Along similar design alternatives, any of the illustrated circuits, components, modules, and elements of the present figures may be combined in various possible configurations, all of which are clearly within the broad scope of this specification. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Various aspects of the illustrative embodiments are described using terms commonly employed by those skilled in the art to convey the substance of their work to others skilled in the art. For example, the term "connected" means a direct electrical connection between the things that are connected, without any intermediary devices/components, while the term "coupled" means either a direct electrical connection between the things that are connected, or an indirect connection through one or more passive or active intermediary devices/components. In another example, the term "circuit" means one or more passive and/or active components that are arranged to cooperate with one another to provide a desired function. Also, as used herein, the terms "substantially," "approximately," "about," etc., may be used to generally refer to being within +/−20% of a target value, e.g., within +/−10% of a target value, based on the context of a particular value as described herein or as known in the art.

Numerous other changes, substitutions, variations, alterations, and modifications may be ascertained to one skilled in the art and it is intended that the present disclosure encompass all such changes, substitutions, variations, alterations, and modifications as falling within the scope of the examples and appended claims. Note that all optional features of the apparatus described above may also be implemented with respect to the method or process described herein and specifics in the examples may be used anywhere in one or more embodiments.

The invention claimed is:

1. An interface circuitry arrangement for communication between integrated circuit (IC) devices, the interface circuitry arrangement comprising:
  serial peripheral interface (SPI) circuitry having an SPI clock port, an SPI data port, and an SPI chip select (CS) port;
  inter-integrated circuit (I2C) circuitry having an I2C clock port and an I2C data port, wherein the I2C clock port and the SPI clock port are electrically coupled to a first connection port, and wherein the I2C data port and the SPI data port are electrically coupled to a second connection port;
  pattern detection circuitry to detect a signal pattern at a third connection port, the pattern detection circuitry comprising a counter to count edges of a CS signal received at the third connection port, the signal pattern comprising a plurality of edges of the CS signal, the third connection port electrically coupled to the SPI CS port, and the third connection port configured to (a) operate as an I2C address terminal for a bit of an I2C address when the I2C circuitry is active and (b) provide the CS signal to the SPI CS port when the SPI circuitry is active; and
  selection circuitry to selectively couple the SPI circuitry or the I2C circuitry to a data path responsive to an output of the pattern detection circuitry.

2. The interface circuitry arrangement of claim 1, wherein the pattern detection circuitry further outputs an indication to select the SPI circuitry responsive to detecting the signal pattern.

3. The interface circuitry arrangement of claim 1, wherein the pattern detection circuitry further outputs an indication to select the I2C circuitry responsive to failing to detect the signal pattern.

4. The interface circuitry arrangement of claim 1, wherein the pattern detection circuitry detects the signal pattern by determining whether a number of transitions from a logic high voltage level to a logic low voltage level in the CS signal received at the third connection port satisfies a threshold number of negative voltage transitions, and the threshold number is greater than 1.

5. The interface circuitry arrangement of claim 4, wherein the threshold number of negative voltage transitions for detecting the signal pattern is a predetermined value.

6. The interface circuitry arrangement of claim 5, wherein the threshold number of negative voltage transitions for detecting the signal pattern is based on a value stored at a register memory.

7. The interface circuitry arrangement of claim 6, wherein the I2C circuitry receives, via the I2C data port, the value on which the threshold number of negative voltage transitions is based, and wherein the received value is stored in the register memory.

8. An integrated circuit (IC) device comprising:
  a register memory;
  an interface circuitry coupled to the register memory, the interface circuitry comprising:
    a serial peripheral interface (SPI); and
    an inter-integrated circuit (I2C) interface;
  a first terminal coupled to a chip select (CS) line of the SPI, wherein the first terminal operates as an I2C address terminal for a bit of an I2C address when the I2C interface is active, and wherein the first terminal operates as a CS terminal for the SPI when the SPI is active;
  a second terminal coupled to a first data line of the SPI;
  a third terminal coupled to a clock line of the SPI and a clock line of the I2C interface;
  a fourth terminal coupled to a second data line of the SPI and a data line of the I2C interface;
  mode detection circuitry coupled to the first terminal, wherein the mode detection circuitry;
    comprises a counter to count negative edges of a signal on the CS line of the SPI,
    monitors for a pattern comprising a plurality of negative edges of the signal on the CS line of the SPI, and
    generates a selection signal for selecting the SPI or the I2C interface based on monitoring for the pattern; and
  selection circuitry to selectively couple the SPI or the I2C interface to the register memory based on the selection signal.

9. The IC device of claim 8, wherein the mode detection circuitry further:
  generates the selection signal for selecting the SPI or the I2C interface based on a comparison of a number of negative edges on the signal on the CS line against a threshold, the threshold being greater than 1.

10. The IC device of claim 9, wherein the mode detection circuitry generates the selection signal by:
  generating a first selection signal for selecting the I2C interface based on the number of negative edges in the signal on the CS line fails to satisfy the threshold; and
  generating a second selection signal for selecting the SPI based on the number of negative edges in the signal on the CS line satisfies the threshold.

11. The IC device of claim 9, wherein the mode detection circuitry comprises:
  edge detection logics to detect negative edges and positive edges in the signal on the CS line; and
  counter logics to increment the counter upon successfully detecting a negative edge followed by a positive edge in the signal on the CS line.

12. The IC device of claim 11, wherein the mode detection circuitry further comprises:
  timer logics to repeat detection of a negative edge in the signal on the CS line upon failing to detect a positive edge transition within a duration subsequent to a negative edge detection.

13. The IC device of claim 9, wherein the second data line of the SPI coupled to the fourth terminal in which the data line of the I2C interface is coupled to corresponds to a master input, slave output (MISO) line of the SPI.

14. The IC device of claim 9, wherein:
the first data line of the SPI coupled to the second terminal corresponds to a master output, slave input (MOSI) line of the SPI; and
the second terminal operates as a general-purpose input/output (GPIO) terminal when the I2C interface is active.

15. The IC device of claim 9, wherein the bit of the I2C address selects the IC device from a plurality of IC devices.

16. A method performed by an integrated circuit (IC) device having serial peripheral interface (SPI) circuitry, inter-integrated circuit (I2C) circuitry, a first terminal coupled to a chip select (CS) line of the SPI circuitry, a second terminal coupled to a data line of the SPI circuitry and a data line of the I2C circuitry, and a third terminal coupled to a clock line of the SPI circuitry and a clock line of the I2C, the method comprising:
monitoring the CS line for a signal pattern, the signal pattern comprising a plurality of edges of a signal received on the CS line via the first terminal, wherein the monitoring comprises counting a number of edges of the signal on the CS line using a counter;
selecting the SPI circuitry for communication based on detecting the signal pattern, wherein the first terminal provides the signal as a CS signal to the SPI circuitry while the SPI circuitry is selected;
communicating, with another IC device using the selected SPI circuitry, data on the data line of the SPI circuitry;
selecting the I2C circuitry for communication based on not detecting the signal pattern; and
using the first terminal as an I2C address terminal for an address bit for the I2C circuitry while the I2C circuitry is selected, wherein the address bit for the I2C circuitry selects the IC device from a plurality of IC devices.

17. The method of claim 16, wherein:
the selecting the SPI circuitry is based on a comparison of the number of negative edges in the signal received on the CS line to a threshold number of negative edges, the threshold being greater than 1.

18. The method of claim 17, wherein the threshold number of negative edges for the comparison in the selecting the SPI circuitry is predetermined.

19. The method of claim 17, wherein the threshold number of negative edges for the comparison in the selecting the SPI circuitry is based on a register read.

20. The interface circuitry arrangement of claim 1, wherein the counter counts falling edges in the CS signal received at the third connection port.

* * * * *